United States Patent [19]

Urbansky

[11] Patent Number: 5,331,671
[45] Date of Patent: Jul. 19, 1994

[54] CIRCUIT ARRANGEMENT FOR BIT RATE ADJUSTMENT TO TWO DIGITAL SIGNALS

[75] Inventor: Ralph Urbansky, Schwaig, Fed. Rep. of Germany

[73] Assignee: U.S. Philips Corporation, New York, N.Y.

[21] Appl. No.: 79,962

[22] Filed: Jun. 18, 1993

Related U.S. Application Data

[63] Continuation of Ser. No. 751,268, Aug. 28, 1991, abandoned.

[30] Foreign Application Priority Data

Sep. 4, 1990 [DE] Fed. Rep. of Germany ....... 4027968

[51] Int. Cl.$^5$ .............................................. H04L 25/36
[52] U.S. Cl. ........................................ 375/118; 370/102
[58] Field of Search ............... 375/108, 111, 112, 118, 375/119; 370/102, 105.3, 108, 112

[56] References Cited

U.S. PATENT DOCUMENTS

| | | | |
|---|---|---|---|
| 4,002,844 | 1/1977 | Doussoux | 320/102 |
| 4,352,181 | 9/1982 | Le Dieu et al. | 375/108 |
| 4,667,324 | 5/1987 | Graves | 370/102 |
| 4,731,646 | 3/1988 | Kliem | 370/102 |
| 4,928,275 | 5/1990 | Moore et al. | 370/102 |

FOREIGN PATENT DOCUMENTS

| | | | |
|---|---|---|---|
| 0216456 | 4/1987 | European Pat. Off. | 370/102 |
| 3315372 | 10/1984 | Fed. Rep. of Germany | |
| 8807300 | 9/1988 | World Int. Prop. O. | 375/118 |

Primary Examiner—Stephen Chin
Assistant Examiner—Young Tse
Attorney, Agent, or Firm—David R. Treacy

[57] ABSTRACT

A buffer memory, in which a first signal is written and from which a second signal is read out, and a subtractor which forms the difference between the counts of a read counter and a write counter, which control reading and writing. A justification decision circuit generates a stop signal for the read counter. An accumulator accumulates the difference signal over a predetermined time interval. The accumulator output, delayed by a time interval and weighted with a second factor, and a justification signal denoting the number of stuff bits caused by the justification decision circuit between two stop instants, are added to the subtractor output in the accumulator.

24 Claims, 1 Drawing Sheet

CIRCUIT ARRANGEMENT FOR BIT RATE ADJUSTMENT TO TWO DIGITAL SIGNALS

This is a division of application Ser. No. 07/751,268 filed Aug. 28, 1991, now abandoned.

BACKGROUND OF THE INVENTION

The invention relates to a circuit arrangement for bit rate adjustment of two digital signals, comprising:

a buffer memory for writing a first signal and reading out a second signal, a subtractor for forming a difference signal by determining the difference between the counts of a read counter used for controlling the read operation and a write counter used for controlling the write operation, and a justification decision circuit for generating a stop signal for the read counter.

Such a circuit arrangement for bit rate adjustment of two digital signals is necessary in information transmission technology, for example, in plesiochronous multiplexers which combine plesiochronous signals. Two digital signals are called plesiochronous when their bit rates deviate from a nominal value within a given tolerance. Before plesiochronous signals are combined by a plesiochronous multiplexer, they are all to be brought to the same bit rate. This bit rate difference is eliminated in that stuff bits are inserted at fixed instants into the signal having the higher bit rate. The signal having the higher bit rate is then structured in a frame. Such a frame may be, for example, the so-called Synchronous Transport Module STM-N (cf. CCITT Recommendations G707, G708, G709). Such a frame is partitioned into rows and each row again contains a specific number of bytes. This frame contains justification locations for variable stuff bits in addition to the justification locations for fixed stuff bits. The justification locations for fixed stuff bits are generally filled with stuff bits, whereas the locations for the variable stuff bits are filled either with information bits or stuff bits. With the positive justification (positive stuffing) technique an information bit or a stuff bit is inserted at a justification location for a variable stuff bit. With the positive/negative justification (negative stuffing) technique an information bit is additionally inserted at a location for a fixed stuff bit as required. A justification decision circuit in the circuit arrangement for bit rate adjustment decides whether a stuff bit or an information bit is to be inserted at a justification location. Because fixed locations in the frames are provided for the stuff bits, these bits can again be removed on demultiplexing. Information about whether a variable stuff bit has been inserted at a justification location can still be transmitted along with the signal having the higher bit rate.

On the receiving side of the transmission system a plesiochronous demultiplexer can be followed by a corresponding circuit arrangement for removing the stuff bits and bringing the bit rate back to its original value. Removing the stuff bits is effected via a buffer memory in which only useful dam are written. The reading operation is controlled by a phase-locked loop so that a clock frequency which is as uniform as possible (having little jitter) is generated. Jitter is understood to mean the deviation of the clock edges from their nominal locations. High-frequency spectral portions in the jitter may be reduced on the receiving side by the low-pass filtering property of the phase-locked loop. However, low-frequency spectral components of the jitter may arise as a result of stuffing. The amplitude of the low-frequency spectral components can only be reduced by means of stuffing i.e. in the circuit arrangement for bit rate adjustment (sending side).

The circuit arrangement mentioned above is known from German Patent Application P 40 18 539, to which copending U.S. patent application Ser. No. 07/711239 corresponds. That circuit arrangement comprises a buffer memory to which a first signal is applied by an input circuit. The input circuit comprises a code converter and a phase-locked loop with incorporated frequency dividers connected thereto. In the code converter the received signal is converted into a binary code and applied to the buffer memory as a first signal. By means of the phase-locked loop and the linked frequency dividers a bit clock signal and clock signals having a higher frequency are produced. The writing in the buffer memory is controlled by a write counter which applies write addresses to the buffer memory with each bit clock signal. The reading from the buffer memory is controlled by a read counter producing read addresses. The counts of the write and read counters are applied to a subtractor which subtracts the count of the read counter from that of the write counter. For a refinement of the result of the subtraction also the higher-frequency clock signals of the phase-locked loop with linked dividers are applied to the subtractor. The result of the subtraction is applied as a difference signal to a justification decision circuit which produces a stop signal for the read counter and justification information signals. The justification decision circuit comprises an adder circuit which receives the difference signal, the adder output signal delayed by one frame in a delay element, and justification signals. A justification signal comprises the information about whether negative or positive stuffing is to be used. A threshold detector following in the circuit after the summing element decides whether a negative or positive stuff bit is to be generated. On the basis of this information from the threshold detector it is decided in a combining circuit whether the read counter is stopped or continues to receive a read clock signal. The adder circuit and the delay element are used for reducing the amplitude of the low-frequency spectral components of the jitter.

SUMMARY OF THE INVENTION

It is an object of the invention to provide a circuit arrangement of the type mentioned in the preamble which reduces the amplitude of the low-frequency spectral components of the jitter by different means.

This object is achieved with the circuit arrangement of the type mentioned in the preamble, in that the justification decision circuit comprises an accumulator which is provided to accumulate, over a predetermined time interval, the difference signal the accumulator output signal delayed by a time interval and weighted with a first factor, and a justification signal representing the number of stuffed bits between two of the stop instants of the read counter caused by the justification decision circuit, and in that the justification decision circuit is provided to form a stop signal for the read counter on the basis of the accumulator output signal.

In the circuit arrangement for bit rate adjustment the subtractor is used for denoting the difference between the counts of the read and write counters and a nominal value. This difference is summed in an accumulator. The mean value thus produced increases the accuracy of the difference between the two counts and the nominal value. The accuracy can be further increased when further clock signals from the first signal are fed to the subtractor with the aid of a phase-locked loop and linked frequency dividers as described in German Patent Application P 40 19 539 If the output signal of the accumulator exceeds a given value after the end of the predetermined time interval, for example, a positive stuff bit will be generated. If the first signal is serially written into the buffer store, i.e. bit-by-bit, a stop signal for the read counter will be produced. When a number of bits are simultaneously stored in the buffer memory (parallel signal processing), a stop signal for the read counter will only be produced after a number of stuff bits have occurred.

The read counter, the subtractor and the justification decision circuit form a control loop in which the accumulator represents the controller. To stabilize the control loop the accumulator receives a secondary signal which equals the accumulator output signal weighted with a first factor, and is delayed by a time interval. In the accumulator the secondary signal is added to the difference signal.

In the accumulator another justification signal is accumulated, which signal denotes the number of stuffed bits that occur between two of the stop instants of the read counter caused by the justification decision circuit. A stop instant is the instant at which the justification decision circuit applies a stop signal to the read counter. For example, in parallel signal processing the justification decision circuit will produce a stop signal only after a number of stuff bits have occurred. The combination of the justification signal weighted with a second factor, the difference signal and the weighted accumulator output signal provides that the justification operation during the accumulation is to be taken into account.

Furthermore, the accumulator effects a reduction of the amplitude of the low-frequency spectral components of the jitter.

If a higher-frequency signal is applied to the circuit arrangement, a parallel signal processing is to be performed when the circuit arrangement is executed in CMOS technology. There is then provided that the buffer memory writes and reads in parallel n-bit data words of the first signal, that a selection matrix is provided to insert stuff bits into the data stream of the second signal supplied by the buffer memory, and that the justification decision circuit also includes a track counter circuit which is provided to determine the justification signal for the number of bits to be stuffed in the selection matrix on the basis of the output signal of the accumulator, to count modulo n the stuffed bits and to generate a stop signal for the read counter for the duration of an accumulation time interval after n stuffed bits. A positive justification technique can be used for this purpose.

In the track number circuit the number of stuffed bits are counted. If n stuffed bits have been generated, the read counter is stopped in response to a stop signal for an accumulation time interval. The accumulation time interval is the period of time which is made available for an accumulation of the signals. When the read counter is stopped, the subtractor forms the difference two times with the same count of the read counter. At the input of the accumulator a justification operation is considered only after n stuff bits have been used when the justification signal weighted with a second factor has not been fed back. As a result of the combination of the justification signal weighted with a first factor and the difference signal, however, each stuff bit is taken into consideration for the accumulation. This improves the behaviour of the control loop formed by the read counter, subtractor and justification decision circuit.

The accumulator comprises a register and an adder circuit, which circuit is provided to combine the output signal of the register following the adder circuit, the difference signal, the weighted justification signal and the delayed and weighted output signal of the register. The weighting of the output signal of the accumulator with a first factor can be performed during each accumulation time interval. A simpler solution is found when there is provided that a decoder circuit is provided to weight with a first factor the output signal of the accumulator, which output signal is delayed by a time interval and to apply the sign bit of the output signal delayed and weighted with a third factor only for the duration of an accumulation time interval of the adder circuit. In this embodiment only a single multiplication of the third factor by one bit is to be performed. Practical experiments have shown that the third factor is 128.

When a variable stuff bit is inserted into the selection matrix, a relevant justification information bit was produced prior thereto. For this purpose, a justification information signal is provided to be formed by the sign bit of the output signal of the accumulator. A justification information signal may also be formed in response to a comparison between the output signal of the accumulator and the value formed by a random-number generator. The random-number generator produces predetermined values within a specific range.

In an embodiment for the track counter circuit there is provided that this circuit comprises a track counter which increments its count by unity and by the justification information after each predetermined time interval and which is provided to supply its count as a justification signal to the selection matrix, and includes a logic circuit which is provided to apply a stop signal to the read counter when the track counter has counted n stuffed bits.

The justification signal is weighted with a second factor in that the outputs of the track counter are coupled to the least significant inputs of the adder circuit, and the difference signal is applied to the most significant inputs of the adder circuit. A register which is provided to store the output signal of the accumulator at the end of the predetermined time interval is inserted between the accumulator and the track counter circuit.

The circuit arrangement for bit rate adjustment is specifically suitable for producing a second signal structured in accordance with an STM-N frame in which the predetermined time interval corresponds to the duration of a row of the frame and an accumulation time interval corresponds to the duration of one byte of a row. An STM-1 frame has nine rows and each row contains 270 bytes. In this case a parallel data word has eight bits.

Circuit elements of the circuit arrangement for bit rate adjustment may also be taken over by microprocessors or other computer-controlled building blocks.

An embodiment of the invention will be further explained with reference to the drawing.

DESCRIPTION OF THE PREFERRED EMBODIMENT

Figure 1:
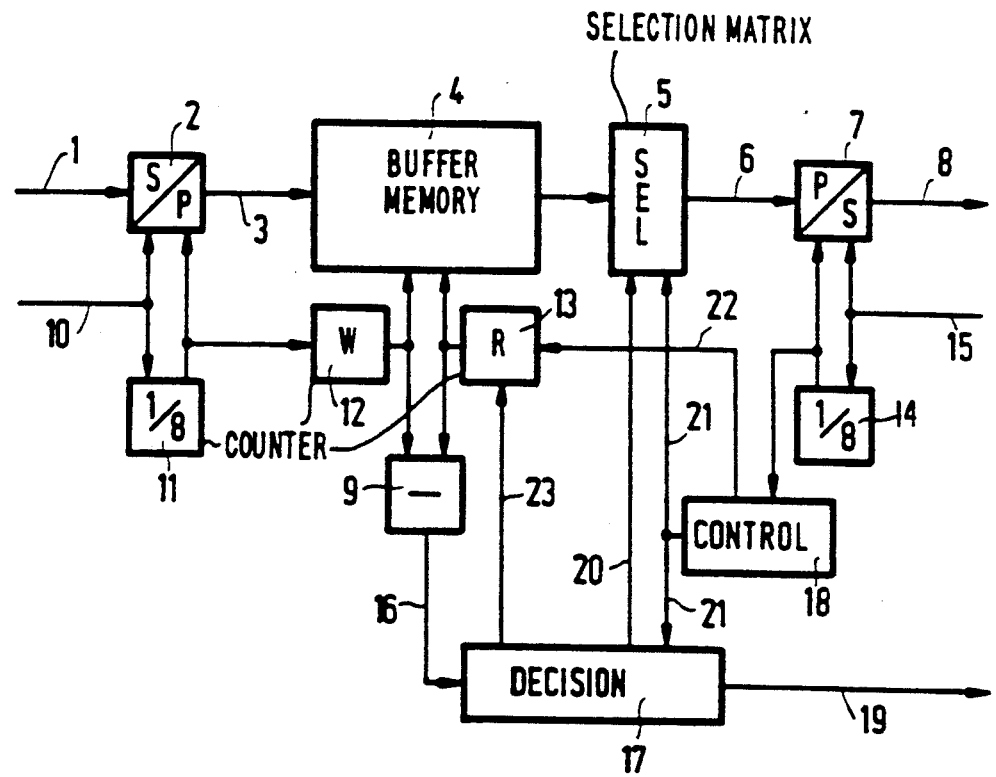
FIG. 1 gives a diagrammatic representation of a circuit arrangement for bit rate adjustment.

In FIG. 1, a first binary signal is applied to a serial-to-parallel converter 2 over a line 1 with a nominal bit rate of 139.264 Mbit/s. In the serial-to-parallel converter 2 a serial data word of, for example, eight bits is applied as a parallel data word of eight bits or one byte to a buffer memory 4 over lines 3. In the buffer memory 4 a parallel data word is buffered and subsequently applied to a selection matrix 5. The selection matrix 5 inserts stuff bits and justification information bits, as well as further auxiliary information, into the stream of data words. The insertion of the bits or auxiliary information is effected at locations provided to this end. The selection matrix 5, which is further described in German Patent Application P 39 20 391, to which U.S. patent application Ser. No. 07/935,149 corresponds; uses the positive justification technique; that is staff bits are inserted into the arriving signal. The output signal of the selection matrix 5 is led over lines 6 to a parallel-to-serial converter 7. The output signal of the parallel-to-serial converter 7 is a second binary signal with a bit rate of 155.52 Mbit/s and structured in frames. The frame is the so-called Synchronous Transport Module STM-1, whose structure for receiving 140 Mbit/s signals can be taken from the CCITT Recommendation G709, FIG. 5.3. An STM-1 frame comprises nine rows and each row has 270 bytes. The second binary signal converted in the parallel-to-serial converter 7 is fed to an output line 8.

In a circuit not further represented in FIG. 1, a bit clock signal is recovered from the first binary signal, which bit clock signal is applied to a clock input of the serial-to-parallel converter 2 and a first frequency divider 11 over a line 10, which frequency divider generates a write clock signal reduced by a factor of 8, whose frequency is 17.408 MHz. This write clock signal is applied to a second clock input of the serial-to-parallel converter 2. The write clock signal further reaches a write counter 12 which increments its count by unity with each clock signal. The write addresses generated by the write counter 12 are applied to the buffer memory 4 which always stores a data word arriving over the lines 3 from the serial-to-parallel converter 2 at such an address generated by the write counter 12.

In a circuit not represented here either the second binary signal is combined with a local bit clock signal which is applied to a clock input of the parallel-to-serial converter 7 and a second frequency divider 14 over a line 15. The second frequency divider 14 divides the bit clock signal supplied over the line 15 also by the factor of 8. As a result of the frequency division in the second frequency divider 14, a read clock signal occurs having a frequency of 19.44 MHz, which is applied to a further clock input of the parallel-to-serial converter 7 and a control circuit 18. The control circuit 18 comprises at least one counter and one decoding circuit which decodes the count of the counter and generates pulses at predetermined counts, which pulses are used for denoting specific bytes within the STM-1 frame or within a row. Such a control circuit 18 is described, for example, in German Patent Application P 39 42 883, to which U.S. patent application Ser. No. 07/628,799 corresponds; or in German Patent Application P 39 42 885, to which U.S. patent application Ser. No. 07/628,793 corresponds. The control circuit 18 also produces a row clock signal whose pulse duration corresponds to the pulse duration of a read clock signal and whose frequency relative to the frequency of the read clock signal is reduced by the factor of 270. Signals of the control circuit 18 are applied to the read counter 13, the selection matrix 5 and a justification decision circuit 17 over lines 21 and 22.

The read counter 13 receives the read clock signal of the second frequency divider 14 from the control circuit 18 over one of the lines 22. With each new pulse of the read clock signal the count of the read counter 13 is incremented by unity. Such a change of the count of the read counter 13 is only made when the justification decision circuit 17 and/or the control circuit 18 do not generate stop signals over a line 23 or lines 22 respectively. A stop signal from the control circuit 18 is produced, for example, when a plurality of one-byte-long fixed stuff bits are inserted. The read counter 13 supplies read addresses to the buffer memory 4. With each read clock signal the dam words stored at the read addresses supplied by the read counter are read out from the buffer memory 4. In this context it should be observed that a write clock signal and a read clock signal for writing and reading, respectively, are further applied to the buffer memory 4, which has not been represented in FIG. 1 for clarity. If the read counter 13 does not proceed as a result of a stop signal on the line 23, a parallel data word will be read out twice from the buffer memory 4.

A comparison of the write addresses with the read addresses takes place in a subtractor 9 which subtracts the count of the write counter 12 from that of the read counter 13. The difference signal arising from the subtraction is applied to the justification decision circuit 17 over lines 16. Because the write counter 12 and the read counter 13 operate with different clock frequencies, the subtractor 9 comprises a synchronization circuit which relates the count of the write counter 12 to the read clock signal. This synchronization circuit comprises a code converter which converts the count of the write counter 12 first into a one-step intermediate code (GRAY code) and, after a sampling with the read clock, reconverts this code again into a code suitable for subtraction (dual code). The code conversion leads to a difference value of zero when the buffer memory 4 is half loaded i.e. with a maximum distance between the count addresses of the write counter 12 and the read counter 13. This state of the buffer memory 4 being half-loaded thus produces a nominal value. A more precise description of the subtractor 9 is disclosed in German Patent Application P 39 42 883.

In the circuit of FIG. 1, a control loop is formed by the subtractor 9, the justification decision circuit 17 and the read counter 13, with which control loop the nominal value is adhered to. Since the read clock signal has a higher frequency than the write clock signal, the read counter 13 is stopped for predetermined periods of time so that the nominal value can be approximated. For a fine adjustment the read counter is stopped during an additional clock signal when the justification decision circuit 17 has produced a stop signal for the read counter 13. The justification decision circuit 17 further supplies the justification signal representing the count of the track counter 33 to the selection matrix 5 over lines 20. In response to this signal a fixed and/or a variable stuff bit is inserted into the data stream supplied by the buffer memory 4. The justification decision circuit 17 then decides only on the insertion of the variable stuff bit. Over one of the lines 21, the control circuit 18 supplies the selection matrix 5 with the information about the time when a fixed stuff bit is to be inserted. Furthermore, the justification decision circuit 17 further supplies over a line 19 a further justification information signal which can be combined with the second binary signal or applied directly to a dejustification circuit. From the justification information signal can be learnt when a variable stuff bit is to be inserted.

Figure 2:
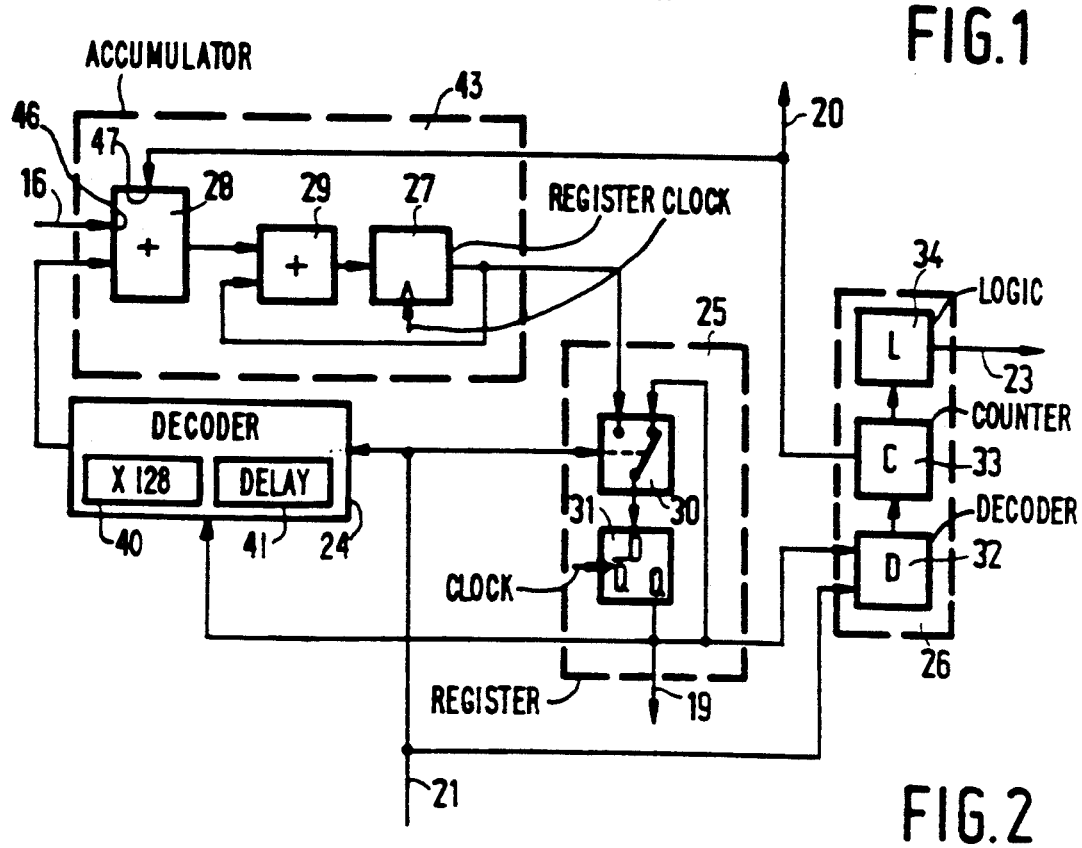
FIG. 2 shows a detailed diagram of a justification decision circuit as shown in FIG. 1.

FIG. 2 shows an embodiment of the justification decision circuit 17. This circuit comprises an accumulator 43, a decoder circuit 24, a register 25 and a track counter 26. A constituent part of the accumulator 43 are an adder circuit and an output register 27. The adder circuit comprises a first adder 28 which receives the difference signal from the subtractor 9 over lines 16, the output signal of the decoder circuit 24 and the justification signal of the track counter 26, and a second adder 29. The difference signal is applied to more significant first inputs 46 and the justification signal to three less significant second inputs of the first adder 28. The smallest more significant input 47 of the first inputs thus has more significance than the largest less significant input of the second inputs. The difference of the significance digits between the smallest more significant input of the first inputs and the largest less significant input of the second inputs is one. The output signal of the decoder circuit 24 forms a secondary signal which; is applied to more significant third inputs of the first adder 28. The output signal of the first adder 28 is applied to first inputs and the output signal of the register 27 to second inputs of the second adder 29, whose outputs are connected to inputs of the register 27. The first and second inputs of the adder 29 always have the same significance. The register 27 further receives the read clock signal for storing the output signal of the second adder 29 with each read clock signal (accumulation time interval).

The most significant output of the register 27 which supplies the sign bit is connected to a first input of a multiplexer 30 included in the register 25. The output of the multiplexer 30 is connected to a D input of a D flip-flop 31 whose non-inverting output is connected to the second input of the multiplexer 30. The non-inverting output of the D flip-flop 31 is further connected to the line 19 which supplies the justification information signal. Furthermore, the non-inverting output is further connected to the track counter circuit 26 and to the decoder circuit 24. The justification information signal contains either a binary "1" or a "0". The multiplexer 30 is controlled by means of a row clock signal applied to the control input of the multiplexer 30 over a line 21. In addition, also the decoder circuit 24 receives the row clock signal at a control input. The decoder circuit supplies the justification information signal multiplied by a factor of 128 to the third inputs of the adder 28 during a read clock signal in a row.

The track counter circuit 26 comprises a counter decoder 32, a track counter 33 and a logic circuit 34. The counter decoder 32 receives the row clock signal and the justification information signal and controls the track counter 33 in such a way that with a binary "1" in the justification information signal the track counter is incremented by two and in the reverse case by unity. The track counter 33 is a modulo-8 counter whose overflow output is connected to the logic circuit 34. If a binary "1" is produced at the overflow output, the logic circuit 34 will produce a stop signal to be applied to the read counter 13 over a line 23. The count of the track counter 33 is applied to the selection matrix 5 and the second inputs of the first adder 28 over three lines 20.

In the accumulator 43 the mean value of the resulting difference of the subtractor 9 is formed over a predetermined time interval i.e. for the duration of one row. After the duration of one row the sign bit of the output signal of the accumulator 43 is stored in the register 25. The sign bit represents a threshold value. Subsequently, a decision is made as to whether a variable stuff bit is to be inserted. Since a stop signal is generated in the logic circuit 34 only after 8 stuff bits have occurred, with each read clock signal the stuff bits are applied to the least significant second inputs of the first adder 28 as a correction signal. If the stuff bits were discarded, the result of the subtraction would generally be negative. Consequently, the bits already stuffed in the first adder 28 are added to this result. In this manner the bits already stuffed are taken into account for the computation of the mean value. A stabilization of the control loop formed by the justification decision circuit 17, read counter 13 and subtractor 9 is achieved by means of the feedback of the most significant bit of the register 27 delayed by one clock period in a delay circuit 41 and weighted in a multiplier 40 in the decoder circuit 24.

I claim:

1. A circuit arrangement for bit rate adjustment, comprising:

a buffer memory, a write counter for controlling writing of a first digital signal into said memory at a first bit rate, a read counter for controlling reading of a second digital signal from said memory at a second bit rate higher than said first bit rate, means for receiving the second digital signal read from said memory, a subtractor for forming a difference signal by determining the difference between the counts of said read and said write counters, and a justification decision circuit for generating stop signals for said read counter, characterized in that the arrangement includes means for inserting into said second digital signal, in said means for receiving, a number of stuff bits between two of the stop signals, the justification decision circuit comprises an accumulator having an output signal; time delay means for weighting by a first factor, and delaying by a first given time interval, at least a portion of said output signal to produce a secondary signal; and means, responsive to said accumulator output signal, for generating one of said stop signals for the read counter and providing a justification signal representing said number of stuff bits, and said accumulator comprises means for accumulating, over a second given time interval, said difference signal, said secondary signal and said justification signal.

2. An arrangement as claimed in claims 1, characterized in said arrangement comprises means for weighting said justification signal, said means for accumulating comprises an adder circuit, a first register receiving an adder output signal from said adder circuit and having a register output which is said output signal, and said adder circuit combines the register output signal, the difference signal, the weighted justification signal and secondary signal.

3. The arrangement as claimed in claim 2, characterized by comprising a decoder circuit which comprises said time delay means.

4. The arrangement as claimed in claim 1, characterized in that said accumulator comprises an output register, and said portion is the most significant bit stored in said output register.

5. A circuit arrangement for bit rate adjustment, comprising:

a buffer memory, a write counter for controlling writing of a first digital signal into said memory at a first bit rate, a read counter for controlling reading of a second digital signal from said memory at a second bit rate higher than said first bit rate, a subtractor for forming a difference signal by determining the difference between the counts of said read and said write counters, and a justification decision circuit for generating stop signals for said read counter, characterized in that the arrangement includes a selection matrix for receiving the second digital signal read from said memory, and for inserting stuff bits into said second digital signal, and the justification decision circuit comprises an accumulator having an output signal; time delay means for weighting by a first factor, and delaying by a first given time interval, at least a portion of said output signal to produce a secondary signal; and means, responsive to said accumulator output signal, for generating one of said stop signals for the read counter and providing a justification signal representing said number of stuff bits, said accumulator comprises means for accumulating, over a second given time interval, said difference signal, said secondary signal and said justification signal, and said means for generating comprises a track counter circuit for a) determining the justification signal for the number of bits to be stuffed in the selection matrix, b) counting the stuffed bits, modulo-n, and c) generating a stop signal for the read counter for the duration of an accumulation time interval after counting n stuffed bits.

6. The arrangement as claimed in claim 5, characterized in that said memory is arranged for writing and reading in parallel n-bit words forming said first signal.

7. The arrangement as claimed in claim 6, characterized in said arrangement comprises means for weighting said justification signal, said means for accumulating comprises an adder circuit, a first register receiving an adder output signal from said adder circuit and having a register output which is said output signal, and said adder circuit combines the register output signal, the difference signal, the weighted justification signal and said secondary signal.

8. The arrangement as claimed in claim 5, characterized by comprising a decoder circuit which comprises said time delay means.

9. The arrangement as claimed in claim 5, characterized in that said justification decision circuit comprises a second register, connected between said accumulator and said track counter circuit, for storing said output signal at the end of said second given time interval.

10. The arrangement as claimed in claim 5, characterized in that the second digital signal is structured in accordance with a Synchronous Transport module (STM-N) frame in which said second given time interval corresponds to the duration of a row of the frame and said accumulation time interval corresponds to the duration of one byte of a row.

11. The arrangement as claimed in claim 5, characterized in said arrangement comprises means for weighting said justification signal, said means for accumulating comprises an adder circuit, a first register receiving an adder output signal from said adder circuit and having a register output which is said output signal, and said adder circuit combines the register output signal, the difference signal, the weighted justification signal and said secondary signal.

12. The arrangement as claimed in claim 11, characterized in that said adder circuit combines the register output signal, the difference signal the weighted justification signal and the delayed and weighted register output signal for an accumulation time interval, and said time delay means comprises a decoder circuit for weighting said output signal delayed by said first given time interval with said first factor, and applying a sign bit of the output signal delayed and weighted by a second factor only for a duration of one said accumulation time interval.

13. The arrangement as claimed in claim 12, characterized in that said sign bit of the output signal forms a justification information signal.

14. The arrangement as claimed in claim 13, characterized in that the track counter circuit comprises a track counter and a logic circuit, wherein said track counter a) increments its count by unity and by the justification information signal after each said second given time interval, and b) supplies its count as a justification signal to the selection matrix, and said logic circuit applies a stop signal to the read counter when the track counter has counted n stuffed bits.

15. The arrangement as claimed in claim 11, characterized in said adder circuit has a less significant digit input and a more significant digit input, and the justification signal from the track counter is coupled to said less significant digit input, and the difference signal is applied to said more significant digit input.

16. The arrangement as claimed in claim 15, characterized in that said justification decision circuit comprises a second register, connected between said accumulator and said track counter circuit, for storing said output signal at the end of said second given time interval.

17. The arrangement as claimed in claim 16, characterized in that the second digital signal is structured in accordance with a Synchronous Transport Module (STM-N) frame in which said second given time interval corresponds to the duration of a row of the frame and said accumulation time interval corresponds to the duration of one byte of a row.

18. The arrangement as claimed in claim 15, characterized in that the second digital signal is structured in accordance with a Synchronous Transport Module (STM-N) frame in which said second given time interval corresponds to the duration of a row of the frame and said accumulation time interval corresponds to the duration of one byte of a row.

19. The arrangement as claimed in claim 5, characterized in that said output signal includes a sign bit, and said sign bit is used to form a justification information signal.

20. The arrangement as claimed in claim 19, characterized in that the track counter circuit comprises a track counter and a logic circuit, wherein said track counter
   a) increments its count by unity and by the justification information signal after each said second given time interval, and
   b) supplies its count as a justification signal to the selection matrix, and
   said logic circuit applies a stop signal to the read counter when the track counter has counted n stuffed bits.

21. The arrangement as claimed in claim 20, characterized in said arrangement comprises means for weighting said justification signal,
   said means for accumulating comprises an adder circuit, a first register receiving an adder output signal from said adder circuit and having a register output which is said output signal, and
   said adder circuit combines the register output signal, the difference signal, the weighted justification signal and said secondary signal; and said adder circuit has a less significant digit input and a more significant digit input, and
   the justification signal from the track counter is coupled to said less significant digit input, and the difference signal is applied to said more significant digit input.

22. The arrangement as claimed in claim 21, characterized in that said justification decision circuit comprises a second register, connected between said accumulator and said track counter circuit, for storing said output signal at the end of said second given time interval.

23. The arrangement as claimed in claim 22, characterized in that the second digital signal is structured in accordance with a Synchronous Transport Module (STM-N) frame in which said second given time interval corresponds to the duration of a row of the frame and said accumulation time interval corresponds to the duration of one byte of a row.

24. The arrangement as claimed in claim 21, characterized in that the second digital signal is structured in accordance with a Synchronous Transport Module (STM-N) frame in which said second given time interval corresponds to the duration of a row of the frame and said accumulation time interval corresponds to the duration of one byte of a row.

* * * * *